United States Patent [19]
Kobayashi et al.

[11] 3,746,959
[45] July 17, 1973

[54] CIRCUIT FOR DRIVING AN ELECTRIC PULSE MOTOR
[75] Inventors: Kengo Kobayashi, Kawasaki, Kanagawa-ken; Mitsuo Manabe, Tokyo, both of Japan
[73] Assignee: Fujitsu Limited, Kawasaki-shi, Kanagawa-ken, Japan
[22] Filed: Oct. 6, 1971
[21] Appl. No.: 186,869

[30] Foreign Application Priority Data
  Oct. 19, 1970  Japan.............................. 45/91810
  Oct. 20, 1970  Japan.............................. 45/91817
  Oct. 20, 1970  Japan.............................. 45/91818

[52] U.S. Cl. ............................ 318/696, 318/685
[51] Int. Cl. ........................................... H02k 37/00
[58] Field of Search................... 318/696, 685, 138, 318/439

[56] References Cited
UNITED STATES PATENTS
3,345,547  10/1967  Dunne ......................... 318/254 X
3,452,263  6/1969  Newell .............................. 313/696
3,465,225  9/1969  O'Regan ............................ 318/138
3,423,658  1/1969  Barrus ............................... 318/696
3,466,520  9/1969  Aylikci et al. ..................... 318/696

Primary Examiner—G. R. Simmons
Attorney—Nelson E. Kimmelman et al.

[57] ABSTRACT

The circuit for driving the electric pulse motor of the present application supplies a large amount of current to the exciting coil of the pulse motor when the rotor of the motor is in a step condition, and a small amount of current when in the stop condition. For this purpose, the circuit of the present invention provides a current detecting circuit in series with the exciting coil. By detecting the current flowing in said current detecting circuit when the rotor is in the step condition, a relatively wide voltage pulse is applied to the exciting coils, and in the stop condition a voltage pulse having a narrow width is applied to the exciting coil. Further improving the starting characteristics and the response characteristics of the pulse motor, the circuit of the present invention provides a spark killer circuit, that is, an integrating circuit which is composed of capacitors and resistors and diodes in parallel with the exciting coil.

7 Claims, 20 Drawing Figures

CIRCUIT FOR DRIVING AN ELECTRIC PULSE MOTOR

The present invention relates to a high efficiency driving circuit for electric pulse motor, more particularly to a circuit which efficiently controls the exciting current in the exciting coil of an electro-magnetic apparatus such as an electric pulse motor, electromagnet, electro-magnetic valve, and prevents hunting arising from the intrinsic vibration of the pulse motor and provides a spark killer circuit.

Generally, the rotor of a pulse motor rotates in a step manner by supplying a pulsive exciting current, that is, the control pulse, to the polyphase exciting coils. When the control pulse is supplied at low speed, the rotor rotates by repeating the step and stop successively. As a result of this, mechanical power is supplied to an external load when the rotor is in the step condition. Thus it is desired from the point view of improving the efficiency that the exciting current supplied to the exciting coil of the pulse motor is high during the step condition of the rotor, and low during its stop condition. For achieving this object, the same inventor filed U. S. Patent application Ser. No. 121,662, Mar. 3, 1971 entitled "A system of driving a pulse motor." In the circuit of that U. S. Patent application Ser. No. 121,662, the purpose is to provide an exciting current having a rapid rise time, and a relatively high voltage is applied to a low resistance circuit, and when the exciting current reaches the predetermined value, said exciting current is cut off, the mean value during a repetition of the process is maintained at a predetermined value. Generally, the driving efficiency of electrical pulse apparatus is improved by supplying a large amount of current at the commencement of driving. However, when the repetition frequency of said high voltage pulse becomes high, a resonance condition due to the intrinsic vibration of the apparatus is produced.

Further, the conventional electric pulse motor uses a mechanical damper on its axis for the purpose of preventing the hunting phenomena produced therein. This is injurious to its starting characteristics and response characteristics.

Further, the conventional circuit for driving the electric pulse motor provides, as a spark killer circuit, a series circuit which is composed of a capacitor and a resistor or a diode and a capacitor, in parallel with the exciting coil. For the same purpose, a circuit using a diode and a clamp source is conventionally used. However, the above-mentioned circuits are also injurious to the starting and response characteristics of the pulse motor, because they require a large time constant.

The object of the present invention is to provide a circuit which overcomes the above-mentioned drawbacks.

Further object of the present invention is to provide an improved driving system which supplies a large chopping current having a rapid rise time at the initial time of driving and thereafter the value of said chopping current is reduced to the predetermined mean value.

Another object of the present invention is to provide an improved driving circuit which detects the above-mentioned chopping current and controls by feed back means the value of said chopping exciting current so that the mean value of said chopping current does not decrease even when the period of said chopping exciting current exceeds the predetermined value.

Still another object of the present invention is to provide an improved driving circuit which provides a current detecting circuit having non-linear characteristics so as to reduce the detected value of the chopping current only in the initial stage of the excitation.

A still further object of the present invention is to provide an improved driving circuit which provides a simplified circuit carrying out the spark killer function and which prevents hunting.

A still further object of the present invention is to provide an improved driving circuit in which an integrating circuit composed of a capacitor, a resistor and a diode are connected in parallel with the exciting coils of the electric pulse motor.

Further features and advantages of the present invention will be apparent from the ensuing description with reference to the accompanying drawings to which, however, the scope of the invention is in no way limited.

Figure 1:
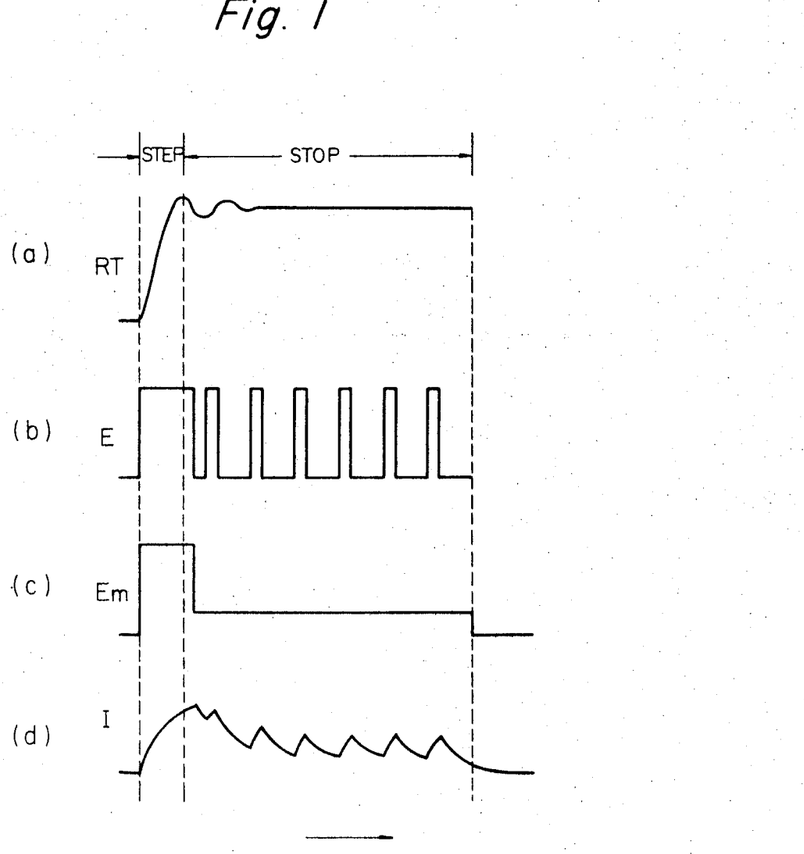
FIG. 1 is a diagram explaining the function of the electric pulse motor.

FIG. 1 shows one example of waveforms of the electric pulse motor per one phase explaining the present invention. When the rotor repeats the step and the stop alternately as shown in (a) of FIG. 1 a pulse E having appropriate pulse width is applied to the exciting coil in the step condition and a pulse having narrow pulse width is applied repeatedly to the exciting coil in the stop condition as shown in (b) of FIG. 1. Accordingly, the mean voltage $E_m$ of these pulses is large in the step condition and small in the stop condition as shown in (c) of FIG. 1. Also, the exciting current I is large in the step condition and small in the stop condition as shown (d) of FIG. 1. Accordingly, this function is equivalent to exciting the coil with two electric sources, that is, a high voltage source and a low voltage source and considerably improves the efficiency of the excitation. Further, the exciting current is switchable by only one switching element per one exciting coil and thus the construction of the circuit becomes very simple and the cost becomes low.

Figure 2A:
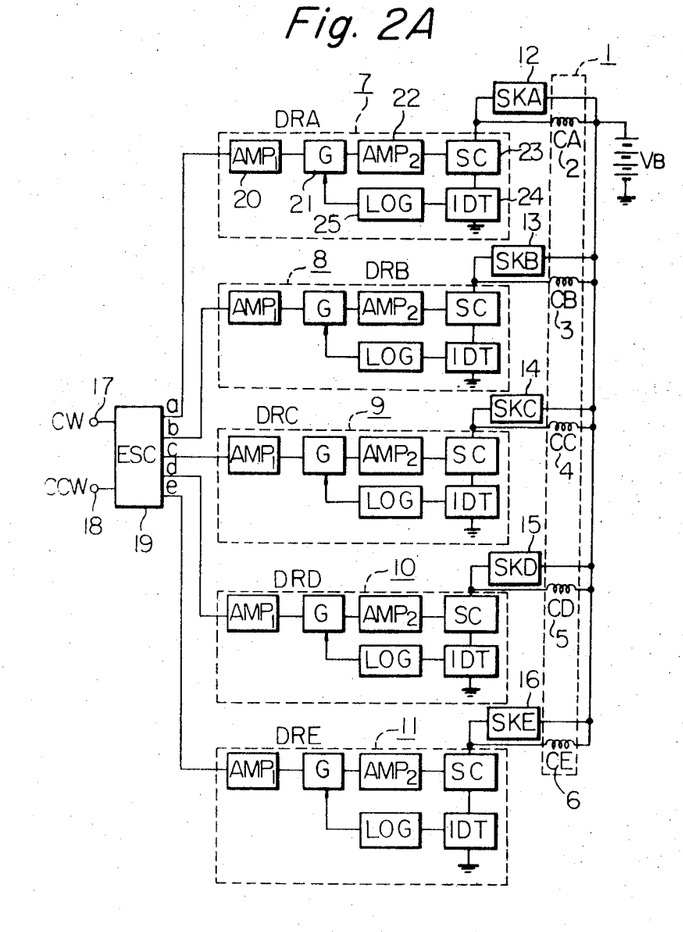
FIGS. 2A and 2B are a block diagram and a waveform of one embodiment of a circuit, for driving an electric pulse motor of the present invention.
Figure 2B:
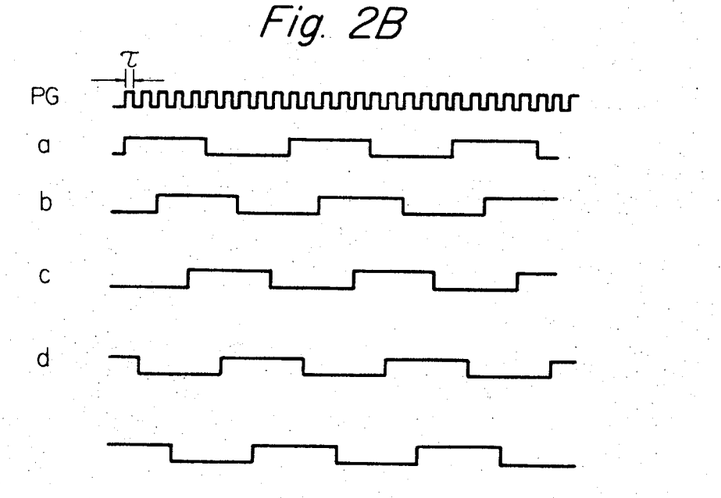

FIG. 2A is one example of the embodiment of the driving circuit of a five phase pulse motor (EPM)1. The exciting coils (CA - CE)2-6 of each phase are connected respectively to driving circuits (DRA - DRE)-7-11 actuated as switching elements. Spark killer circuits (SKA - SKE)12-16 are connected in the exciting coils (CA - CE) respectively. Further, the exciting coils 2-6 are connected to the voltage source $V_B$. Referring to FIG. 2A, the command pulse PG as shown in FIG. 2B is applied to a positive direction terminal (CW)17 or a negative direction terminal (CCW)18 of the alternative two phase—three phase exciting control circuit (ESC)19. The exciting control circuit 19 then distributes the control signals from its output terminal (a - e) as shown in FIG. 2B so as to repeat alternatively the two phase excitation and the three phase excitation in the predetermined phase order. The duty cycles of the output signals from the output terminal (a - e) are 50 percent. Referring to FIG. 2A, when the output signal at the output terminal a, for example, is applied to the driving circuit 7, said signal is supplied to gate 21 via an amplifier 20, and actuates via an amplifier 22 a switching circuit 23. Then, the current flows from an electric source $V_B$ to an exciting coil 2. The current flow in the exciting coil 2 is detected by a current detecting circuit 24 and the detected current is applied to an integrating circuit 25, and the output of the integrating circuit controls the gate 21. That is, when the current detected by the current detecting circuit 24 reaches a predetermined value, the exciting current flow in the coil 2 is interrupted by the switching circuit 23. By repeating this, a predetermined mean current flows in the coil 2. In this case, the detected current in the current detecting circuit 24 is integrated in the integrating circuit 25. Accordingly, if the exciting current reaches a predetermined value in the initial period of the excitation, the exciting current is not interrupted by the switching circuit. The exciting current continues to increase exponentially in accordance with the time constant of the circuit. When the integrated value of the exciting current reaches a predetermined value, then the exciting current is interrupted by the switching circuit 23 and after that chopped so as to maintain said current at the predetermined mean value.

Figure 3:
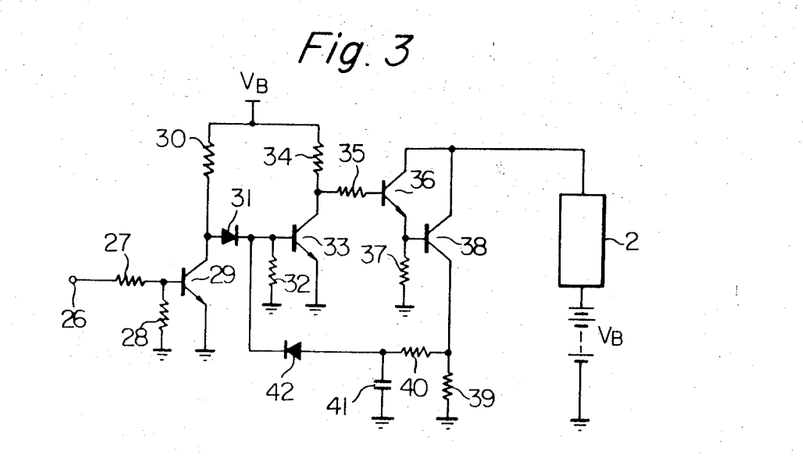
FIG. 3 is a circuit diagram of a driving circuit for one phase of the present invention.

FIG. 3 shows a driving circuit of one embodiment of FIG. 2A. Referring to FIG. 3, an input terminal 26 is connected to a series circuit consisting of resistors 27 and 28. The function of the resistors 27 and 28 is connected to the base of a transistor 29 whose emitter is grounded. The collector of the transistor 29 is connected via a resistor 30 to a positive source potential $V_B$. The collector of the transistor 29 is also connected via a diode 31 to the base of a transistor 33 whose emitter is grounded. The base of the transistor 33 is connected via a resistor 32 to ground and the collector of the transistor 33 is connected via a resistor 34 to the positive source potential $V_B$ and also via a resistor 35 to the base of the transistor 36 whose emitter is connected to the base of the transistor 38 and further connected via a resistor 37 to ground. The collectors of the transistors 36 and 38 are connected to an exciting coil 2 and a power source $V_B$. The emitter of the transistor 38 is connected to a resistor 39 whose other terminal is grounded. The junction of the emitter of the transistor 38 and the resistor 39 is connected via a resistor 40 to a capacitor 41 whose other terminal is grounded. The function of the capacitor 41 and the resistor 40 is connected via a diode 42 to the base of the transistor 33.

Figure 4:
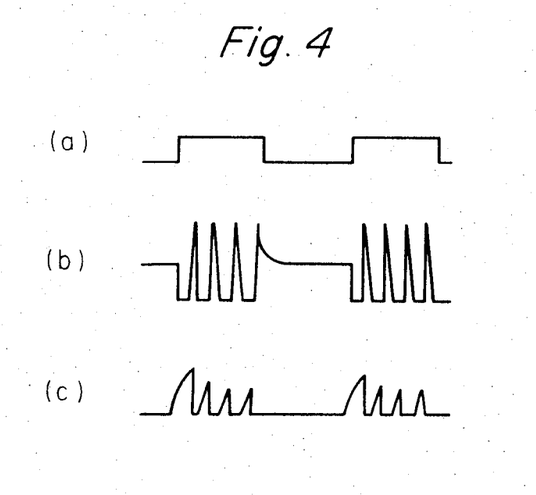
FIG. 4 is a diagram showing waveforms in the circuit of FIG. 3.

When the exciting signal as shown in (a) of FIG. 4 is applied to the base of the transistor 29, the transistor 29 becomes conductive state and the potential of the collector of the transistor 29 falls and thus the transistor 33 becomes non-conductive. Consequently, the transistors 36 and 38 become conductive and the exciting current flows from the source $V_B$ to the exciting coil 2. This exciting current is detected as a voltage drop in the resistor 39, and this detected value is integrated by the capacitor 41. As the charged voltage in the capacitor 41 is zero in the initial state of the excitation, the voltage across the resistor 39 charges the capacitor 41 via the resistor 40. When said voltage reaches a predetermined value, the transistor 33 becomes conductive and thus the transistors 36 and 38 become non-conductive. The time constant of discharge of the capacitor 41 is made comparatively large. As a result of this, when the exciting current flows again, the detected value in the resistor 39 is applied immediately to the base of the transistor 33, because, in this case, the initial value of the voltage across the capacitor 41 is not zero. Then the exciting current is interrupted to bring the detected value to the predetermined value.

As mentioned above, when the exciting signal as shown in (a) of FIG. 4 is applied to the base of the transistor 29, the exciting current as shown in (c) of FIG. 4 flows in the exciting coil. A large amount of exciting current flows in the initial stage of the excitation and gradually drops to a current of predetermined mean value. Further, (b) of FIG. 4 shows the variation of the potential between the emitter and the collector of the transistor 38. In the above-mentioned embodiment, the integration circuit is used for the purpose of providing non-linear characteristics to the current detecting circuit. However, other types of non-linear elements can also be used for this purpose. Namely, a varistor or a thermister, for example, can be used in place of the resistor 39, or in parallel with the resistor 39.

Figure 5:
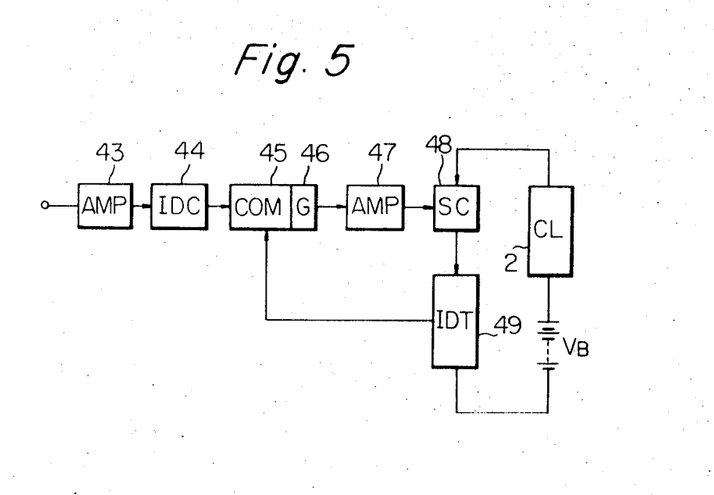
FIG. 5 is a block diagram of another driving circuit of the present invention.

FIG. 5 is a block diagram of another embodiment of the driving circuit shown in FIG. 2A. Referring to FIG. 5, the exciting signal is applied to the detected current controlling circuit (1DC) 44 via an amplifier 43. The output of the detected current controlling circuit 44 and the output of the current detecting circuit (1DT) 49 are compounded in the compound circuit (COM) 45, and the output of the compound circuit 45 controls the gate 46. The output of the gate 46 controls via an amplifier 47 the switching circuit 48, that is, the exciting current which flows in the exciting coil 2. The exciting current is detected in the current detecting circuit (1DT) 49 and the output of the circuit 49 is applied to the compound circuit 45 as mentioned above.

Figure 6:
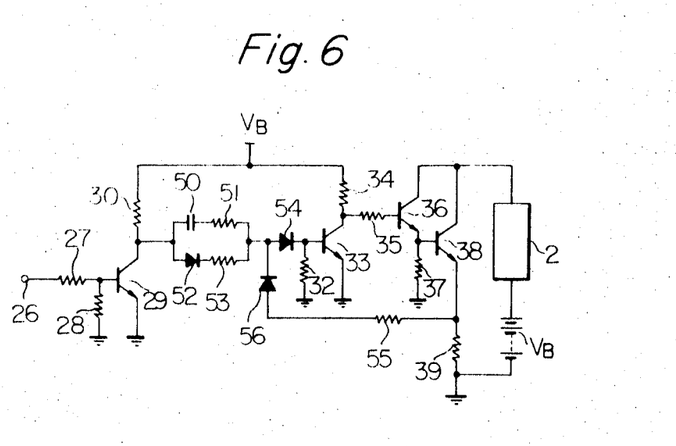
FIG. 6 is a circuit of the driving circuit of FIG. 5.

FIG. 6 is a circuit diagram of the embodiment shown in FIG. 5. The difference of the circuit of FIG. 6 from that of FIG. 4 is as follows. The detected current controlling circuit 44 and the compound circuit 45 are connected between the collector of the transistor 29 and the base of the transistor 33. Namely, the detected current controlling circuit is composed of one series circuit comprising a capacitor 50 and a resistor 51 and another series circuit comprising a diode 52 and a resistor 53. One terminal of the detected current controlling circuit is connected to the collector of the transistor 29 and the other terminal of said circuit is connected via a diode 54, which is used as the compound circuit, to the base of the transistor 33. The junction between the emitter of the transistor 38 and the resistor 39 is connected via a resistor 55 and a diode 56 to the junction of the detected current controlling circuit and the diode 54.

When the exciting current flows in the exciting coil 2 via the transistor 38, the voltage across the resistor 39 is applied via the resistor 55, diodes 56 and 54 to the base of the transistor 33. If the exciting current falls to the predetermined value, the transistor 33 becomes conductive and the transistors 36 and 38 become non-conductive whereby the exciting current is interrupted. As a result of this, the voltage drop across the resistor 39 decreases and the transistor 33 again becomes non-conductive and the exciting current begins to flow. As mentioned above, the chopped exciting current flows in the exciting coil 2.

Figure 7:
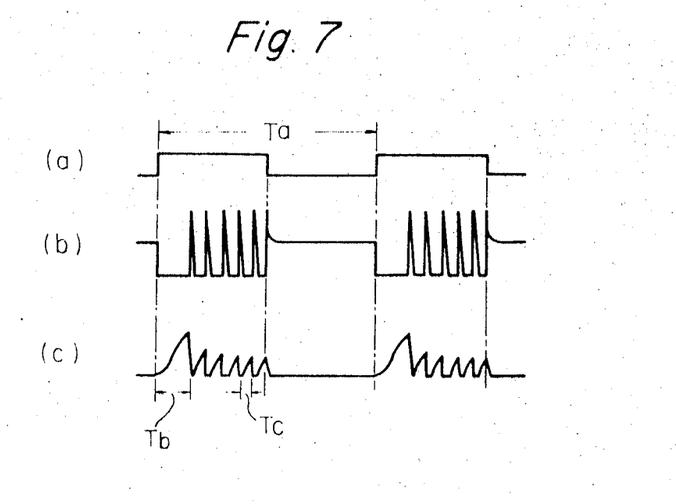
FIG. 7 is a diagram showing waveforms in the circuit of FIG. 6.

In the initial state, the capacitor 50 is charged by the source $V_B$ via the resistors 30, 51 and 32 and the diode 54. When an exciting signal as shown in (a) of FIG. 7 is applied to the input terminal 26 and the transistor 29 becomes conductive, the potential of the base of the transistor 33 decreases in accordance with the potential of the capacitor 50 and the transistor 33 becomes non-conductive and the transistors 36 and 38 become conductive and the exciting current flows in the exciting coil 2. Accordingly, the voltage across the resistor 39 increases. However, the exciting current continues to increase until the charged voltage of the capacitor 50 falls to the predetermined value. When the capacitor discharges via the transistor 29, the resistors 51, 39 and 55 and the diode 56, the voltage across the resistor $R_{10}$ reaches a value which makes the transistor 33 conduct, and the exciting current is interrupted. After that, the exciting current is interrupted every time it reaches the predetermined value, and thus maintains the predetermined mean value, as shown in (c) of FIG. 7 wherein Tc is the chopping period in the normal state and Tb is the chopping period in the initial state of the exciting signal. As shown in (c) of FIG. 7, a large current having a rapid rise time flows in the initial period of the excitation, and after that the exciting current falls to a mean current having a predetermined value. The variation of the potential between the collector and emitter of the transistor 38 is shown in (b) of FIG. 7. Referring to FIG. 6, the diode 52 and the resistor 53 are provided for clamping the voltage across the capacitor 50, and the above-mentioned function is not affected in the case of omitting these elements.

Figure 8:
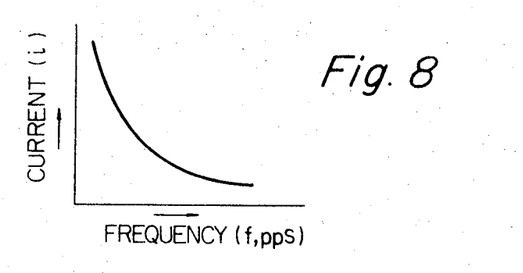
FIG. 8 is a characteristic curve showing the relation between the repetition frequency and the exciting current of the conventional circuit.
Figure 9:
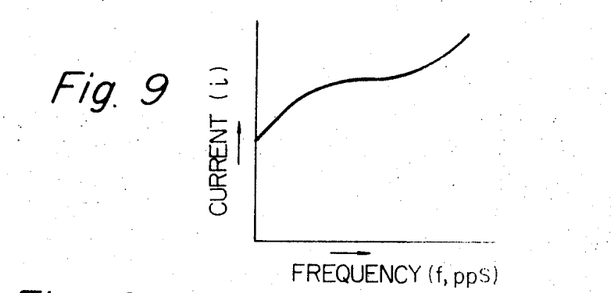
FIG. 9 is a characteristic curve showing the relation between the repetition frequency and the exciting current of the present invention.

When the repetition frequency of the exciting signal increases, the mean value of the exciting current also increases as shown in FIG. 9, because the exciting current in the initial period of the excitation is large and the period during which the exciting current has a small mean current decreases. In the conventional circuit, the mean value of the exciting current has a tendency to decrease with respect to the repetition frequency as shown in FIG. 8.

Figure 10:
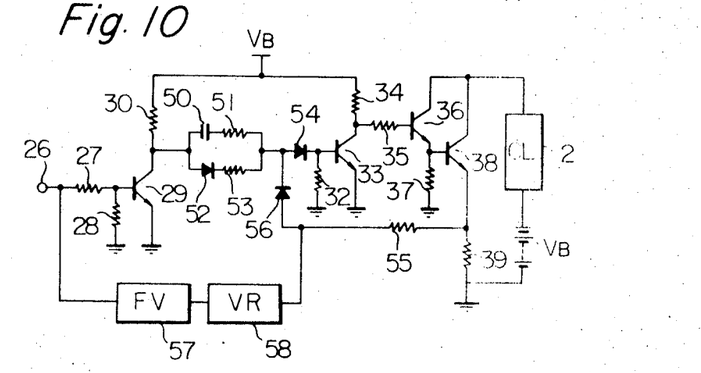
FIG. 10 is a circuit diagram of another embodiment of the present invention.

Referring to FIG. 10, a converter (FV) 57 which converts the repetition frequency of the exciting signal to the corresponding voltage and a control circuit (VR) 58 which controls the detected voltage in the resistor 39 are added to the circuit shown in FIG. 6. The converter 57 may be composed of either a digital analog converter or an integrating circuit using a capacitor. The control circuit 58 is composed of, for example, a circuit which controls a variable resistor by using a transistor, etc. When the frequency of the exciting signal increases, the converter 57 converts said frequency to a voltage which is inversely proportional to said frequency. Said voltage is applied to the control circuit 58 and controls the voltage applied to the base of the transistor 33 from the resistor 39. As a result of this, the exciting current continues to flow until said current reaches a value exceeding the predetermined value and then the mean value of the current increases. When the frequency of the exciting signal further increases, the exciting current is no longer chopped. Further, if the frequency of the exciting current is known, the detected value in the current detecting circuit can be controlled by using the circuit shown in FIG. 10.

Figure 11:
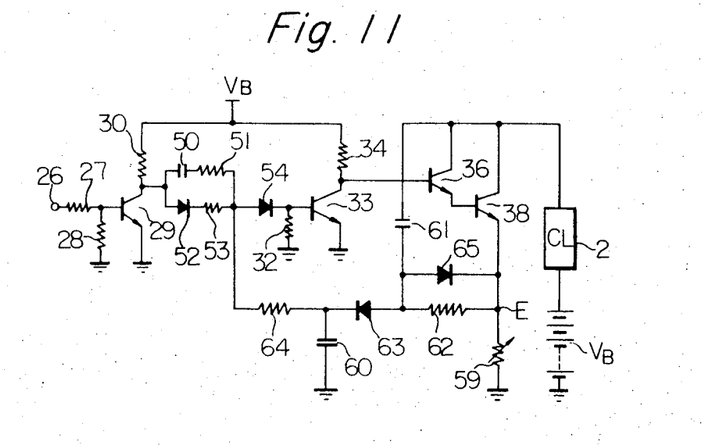
FIG. 11 is a circuit diagram of the apparatus actually used in the present invention.

FIG. 11 shows the driving circuit which is actually used in the electric pulse motor. Referring to FIG. 11, a variable resistor 59 having the value of 0.28 ohm to 0.38 ohm is connected between the emitter of the transistor 38 and ground. The junction of the emitter of the transistor 38 and the resistor 59 is connected via a resistor 62 and a diode 63 to a capacitor 60 whose other terminal is grounded. A capacitor 61 is connected between the junction of the collectors of the transistors 36 and 38 and the junction of the diode 63 and the resistor 62, and a diode 65 is connected in parallel with the resistor 62. The junction of the capacitor 60 and the diode 63 is connected via a resistor 64 to the junction of the resistor 51 and the diode 54.

Figure 12:
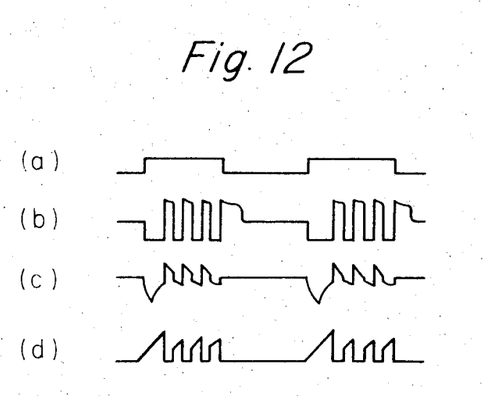
FIG. 12 shows waveforms explaining the function of the circuit of FIG. 11.

When the voltage source $V_B$ is applied to the circuit shown in FIG. 11, the capacitors 50, 60 and 61 are simultaneously charged and the transistor 33 becomes conductive. Next, when the input signal is applied to the input terminal 26, the transistor 29 becomes conductive, the transistor 31 becomes non-conductive and the transistors 36 and 38 become conductive. At this time, the capacitors 50, 60 and 61 simultaneously begin to discharge, and an exciting current flows in the exciting coil 2, and the electric potential in E increases exponentially. After the discharge in the circuit of the capacitor 61 — the transistor 38 — the resistor 62 is finished, the diode 63 becomes conductive by the increase of the potential of E and thus the capacitors 50 anc 60 are charged. After the diode 63 becomes conductive, the transistor 33 becomes conductive and the transistors 36 and 38 become non-conductive. As a result of this, the first operation for interrupting the exciting current is completed. After that, the capacitor 60 is charged via the capacitor 61 and the diode 63 by the voltage surge which is produced at the moment the transistor 38 is interrupted. This charged voltage is discharged with the time constant of the resistor 64 and the capacitor 60. When the above-mentioned discharge is finished, the transistor 33 becomes non-conducting and the transistors 36 and 38 become conducting. As a result of this, the exciting current begins to flow again in the exciting coil 2 and the capacitor 61 begins to discharge. After the capacitor 61 is completely discharged, the increased potential across the resistor 59 renders the diodes 63 and 54 conductive and the transistor 33 becomes conductive and the transistors 36 and 38 become non-conductive. As a result of this, the second operation for interrupting the exciting current is completed. Thereafter, the above-mentioned operation is repeated continuously while the input signal as shown in (a) of FIG. 12 is applied to the input terminal 26 and the exciting current having the waveform shown in (d) of FIG. 12 flows in the exciting coil. Waveform (b) of FIG. 12 shows the voltage between the collector of the transistor 38 and ground, and waveform (c) of FIG. 12 shows the voltage across the capacitor 60.

Figure 13:
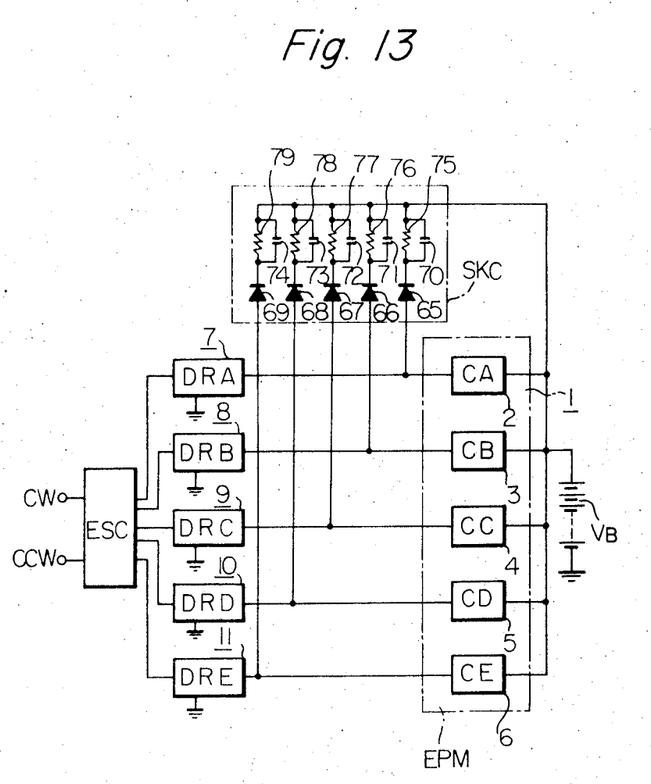
FIG. 13 is a block diagram of the driving circuit showing the circuit for preventing hunting and the circuit of the spark killer.
Figure 14:
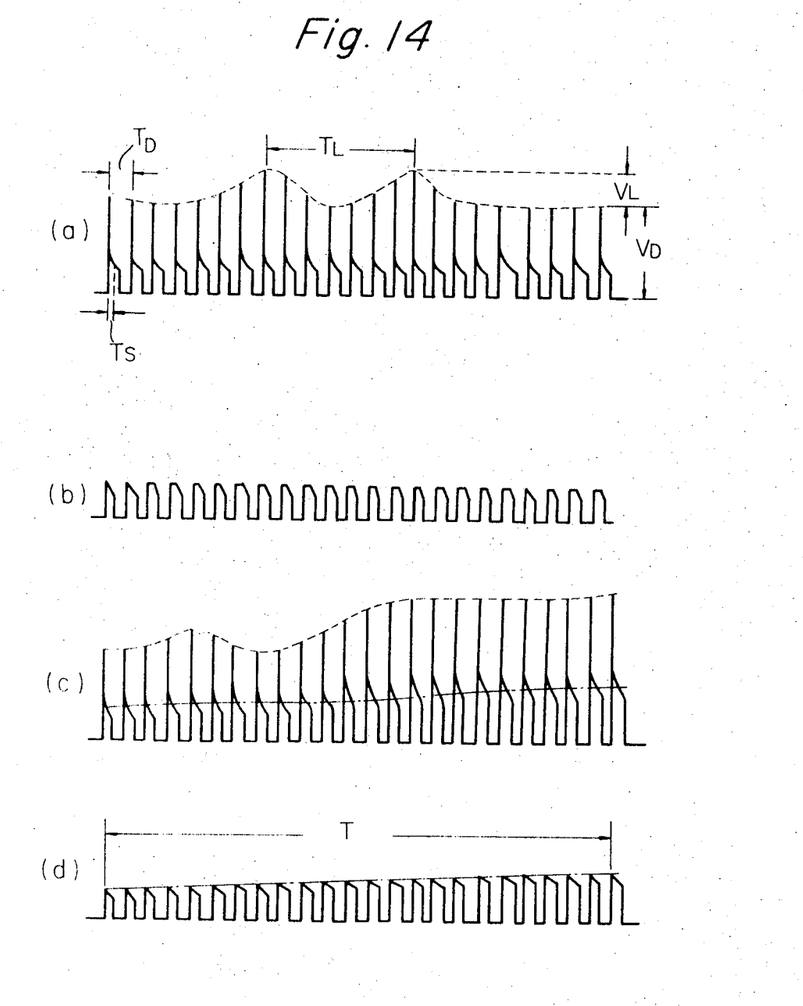
FIG. 14 shows waveforms explaining the block diagram of FIG. 13.

In the next place the explanation will be given concerning to the spark killer circuit. Referring to FIG. 13, the spark killer circuit are connected in parallel to the exciting coil 2 – 5 of the electric pulse motor 1 respectively. The circuits are respectively composed of diodes 65 – 69 and the parallel circuits which are connected to said diodes and composed of resistors 75 – 79 and capacitors 70 – 74. When the spark killer circuit is not connected to the exciting coil, the exciting current flowing from the driver circuits 7 – 11 is accompanied by the voltage due to the counter electromotive force as shown in (a) and (c) of FIG. 14. Referring to this figure, $T_S$ is the width of the spark voltage, $T_D$ is the period of the exciting current, $T_L$ is the period of the oscillation, $V_D$ is the spark voltage, and $V_L$ is a varying part of the spark voltage. It is seen that the variation of the spark voltage increases when the load decreases and the variation of the spark voltage decreases when the load increases. When the spark killer circuit is connected to the exciting coils 2 – 6, the spark voltage decreases as shown in (b) and (d) of FIG. 14. The time constant T of the integrating circuit composed of the resistor and the capacitor in the spark killer circuit is selected as shown below.

$$T >> T_S;\ T >> T_D;\ T >> T_L$$

Accordingly, the variation due to the natural oscillation is absorbed and produces no hunting with a slow variation of the load.

Figure 15:
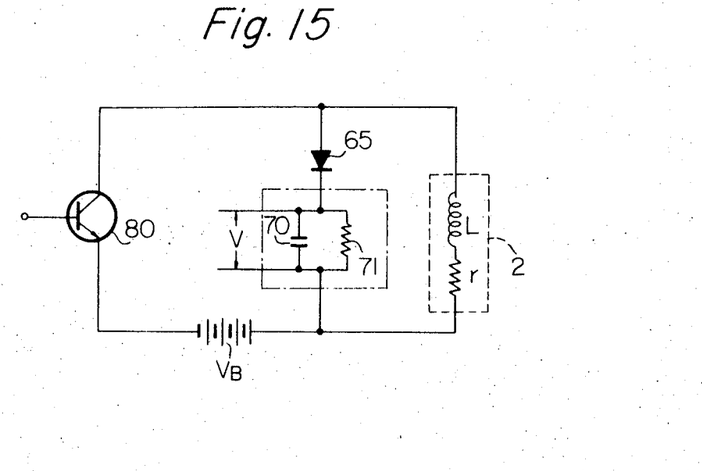
FIG. 15 is a circuit per one phase of FIG. 13.

Referring to FIG. 15, the exciting coil 2 per one phase is composed of an inductance L and a resistor r, and spark killer circuit which is composed of a diode 65, a resistor 71 and a capacitor 80 is connected in parallel to the exciting coil 2. The source voltage $V_B$ is supplied to the parallel circuit of the exciting coil 2 and the spark killer circuit via a switching circuit composed of a transistor 80. The spark voltage produced during time of interruption of the exciting current is supplied via the diode 65 to the integrating circuit and absorbed by the capacitor 70 thereby decreasing the spark voltage. Further, as the integrating circuit has a time constant T larger than the period of the natural oscillation $T_L$, the instantaneous variation due to the natural oscilation is absorbed by the integrating circuit. That is, said integrating circuit acts as the damper for the electric pulse motor. When the value of the spark voltage falls below the value of the voltage V across the capacitor 70, the diode 65 is reversely biased and the integrating circuit is separated from the exciting coil. As a result of this, the falling time constant Ti, that is, $$Ti = L/(R_1 + r)$$

becomes zero. Then the exciting current falls rapidly. Accordingly, the above-mentioned spark killer circuit does not spoil the response characteristics of the exciting coil. It is necessary to reduce the peak spark voltage because of passible damage to transistor 80 and thus the spark killer circuit is necessary but the spark killer circuit has the disadvantage that it slightly adversely affects the falling characteristics of the exciting current. Also, if the spark killer circuit contains resistors or capacitors and has a large time constant in the falling time of the exciting current, the response characteristics of the current is spoiled. However, in the present application, the spark killer circuit does not spoil the response characteristics as diodes are used in series with the integrating circuit.

Figure 16:
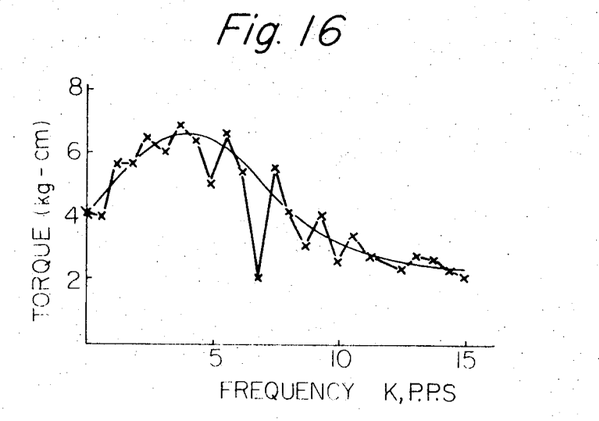
FIG. 16 is a characteristic curve showing the relation between the repetition frequency of the pulse and the torque of the conventional circuit.
Figure 17:
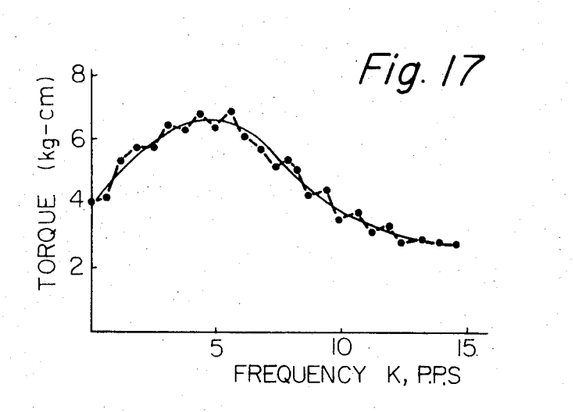
FIG. 17 is a characteristic curve showing the relation between the repetition frequency of the pulse and the torque according to the present invention.

FIG. 16 shows the relation between the repetition frequency of the pulses KPPS (1000 pulse/second) and the torque kg-cm in the conventional driving circuit for the electric pulse motor. As shown in this figure, large valley points appear in the curve and these points are due to the natural oscillation of the electric motor. However, in the present invention, the variation of the torque is not great as shown in FIG. 17.

Figure 18:
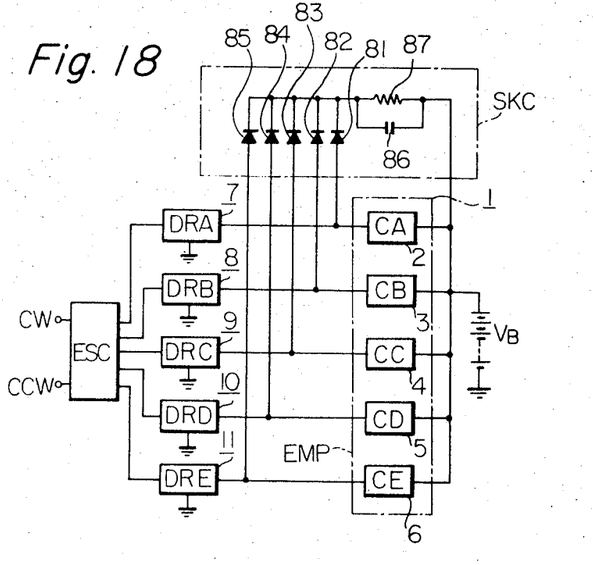
FIGS. 18 and 19 are block diagrams of another embodiment referring to FIG. 11.
Figure 19:
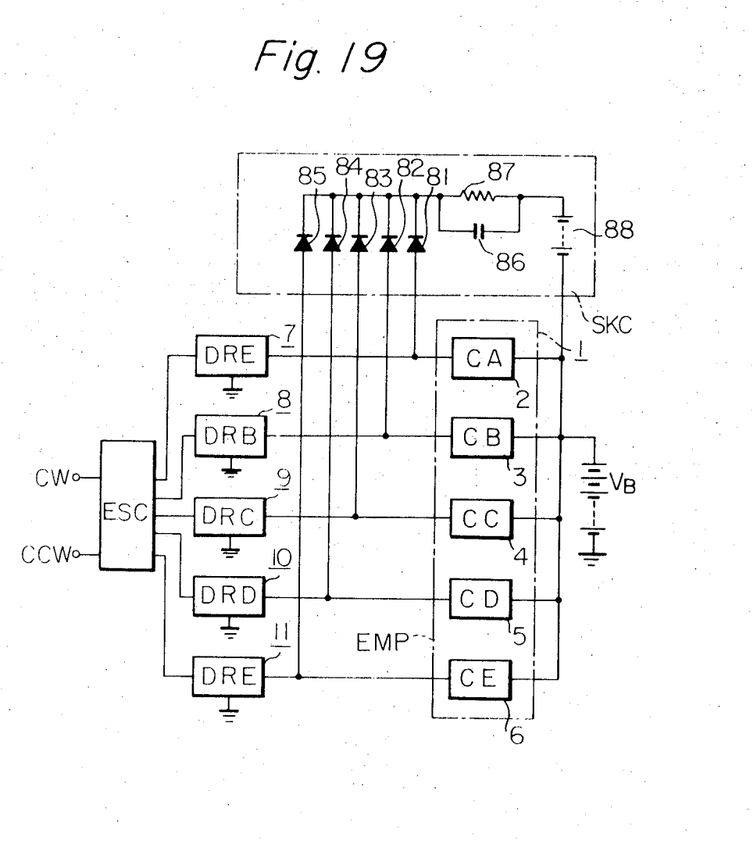

FIGS. 18 and 19 show other examples of the spark killer circuit. In FIG. 18, the integrating circuit composed of a capacitor 86 and a resistor 87 is commonly used for exciting coils 2 – 6 and said integrating circuit is connected to diodes 81 – 85. In FIG. 19, an electric source ($V_S$) 88 is used in the spark killer circuit. This source 88 is provided for compensating the voltage V appearing across the capacitor C when said voltage is too low.

What is claimed is:

1. A circuit for driving a multiphase electric pulse motor having a plurality of exciting coils for said phases respectively coupled to a DC voltage source, comprising:

driving circuits for each phase respectively coupled to said exciting coils, an exciting control circuit adapted to receive a command pulse train at its input, said exciting control circuit also having a plurality of output terminals connected respectively to said driving circuits, each of said driving circuits receiving an exciting control signal from said exciting control circuit and including means for chopping said DC voltage so as to alternately supply said DC voltage to said exciting coil and cut off said DC voltage therefrom during the time that said exciting control signal is applied to said driving circuit, said driving circuit also including means for establishing the period of the first supply of said DC voltage to said exciting coils to be longer than that of the subsequent supply of said DC voltage thereto.

2. A circuit for driving a multiphase electric pulse motor having a plurality of exciting coils for said phases respectively coupled to a DC voltage source, comprising:

driving circuits for each phase respectively coupled to said exciting coils, an exciting control circuit adapted to receive a command pulse train at its input, said exciting control circuit having a plurality of output terminals connected respectively to said driving circuits, each of said driving circuits receiving an exciting control signal from said exciting control circuit and including means responsive to said exciting control signal for producing during the step interval of said motor a first voltage pulse and for producing during the stop interval a selected number of pulses having a width substantially less than the width of said first pulse.

3. The circuit according to claim 7 wherein the amplitude of said first pulse and the amplitude of said selected number of pulses is substantially the same.

4. Circuit for driving an electric pulse motor according to claim 1, wherein said driving circuit comprises a switching circuit connected to said exciting coil, a current detecting circuit connected said switching circuit, said current detecting circuit providing non-linear characteristics so that detected values of the current in said current detecting circuit are of low value only in the initial stage of the excitation, and said switching circuit being switched by the detected values in said current detecting circuit.

5. Circuit for driving an electric pulse motor according to claim 1, wherein said driving circuit comprises a switching circuit connected to said exciting coil, a current detecting circuit connected to said switching circuit, a detected current controlling circuit controlling detected values in accordance with the initial state of said exciting control signal, and said switching circuit being switched by said detected values in said current detecting circuit.

6. Circuit for driving an electric pulse motor according to claim 5, wherein said driving circuit is further comprises a converter for converting the frequency of said exciting control signal into a voltage inversely proportional to said frequency and a control circuit controlling said detected values in said current detecting circuit using the output of said converter thereby controlling the mean value of said exciting current.

7. Circuit for driving an electric pulse motor according to claim 1, further comprising a spark killer circuit which is composed of an integrating circuit containing a resistor and a capacitor and a diode connected in series with said integrating circuit, said spark killer circuit being provided in parallel with said exciting coil.

* * * * *